United States Patent [19]

Prost

[11] Patent Number: 4,775,792
[45] Date of Patent: Oct. 4, 1988

[54] STRIP OF INFRA-RED DETECTORS COMPRISING A COLD SCREEN WITH A CONSTANT VIEWING ANGLE

[75] Inventor: Roger Prost, St. Egreve, France

[73] Assignee: Thomson-CSF, Paris, France

[21] Appl. No.: 893,016

[22] Filed: Aug. 4, 1986

[30] Foreign Application Priority Data

Aug. 13, 1985 [FR] France .................. 85 12351

[51] Int. Cl.$^4$ .............................................. G01J 5/02
[52] U.S. Cl. .................... 250/352; 250/332; 250/353
[58] Field of Search .................... 250/353, 352, 332

[56] References Cited

U.S. PATENT DOCUMENTS

| 4,420,688 | 12/1983 | Le Bars | 250/352 |
| 4,644,147 | 2/1987 | Züblin | 250/221 |

FOREIGN PATENT DOCUMENTS

| 0125016 | 11/1984 | European Pat. Off. | |
| 0089723 | 7/1980 | Japan | 250/352 |
| 2115143 | 9/1983 | United Kingdom | 250/353 |

Primary Examiner—Janice A. Howell
Assistant Examiner—Constantine Hannaher
Attorney, Agent, or Firm—Roland Plottel

[57] ABSTRACT

The invention uses a strip of infra-red detectors comprising a cold screen of the type that provides a constant viewing angle for all the directors in a direction that is prependicular to the axis of the strip. Two cylindrical mirrors are set at the ends of the strip and placed in the heated part of the cryostat containing the strip and the cold screen. The shape and dimensions of the mirrors as well as their positions are chosen so that the detector placed in the center of the strip detects, through reflection in two mirrors, only cold surfaces while the other detectors detect heated surfaces, through reflection in the two mirrors, in a proportion that increases with distance from the central detector of the strip, so that, along the axis of the strip, every detector has a substantially constant viewing angle. Applications: large-sized strips, for example in space applications.

5 Claims, 2 Drawing Sheets

FIG_1-a
PRIOR ART
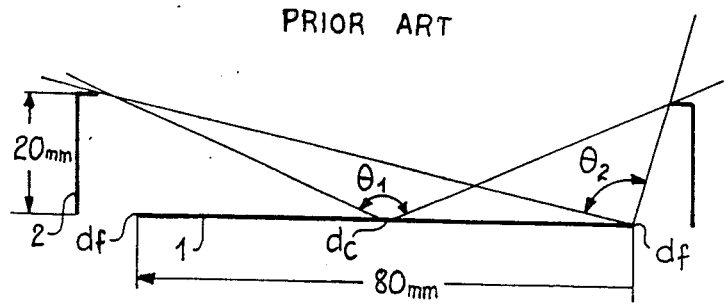
FIG_1-b
PRIOR ART
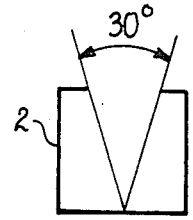
FIG_1-c
PRIOR ART
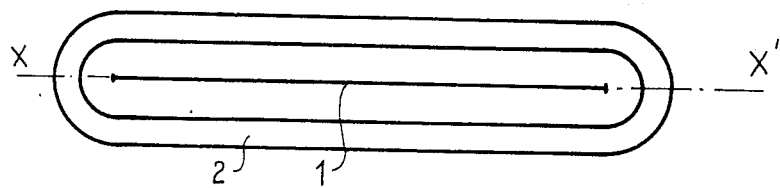

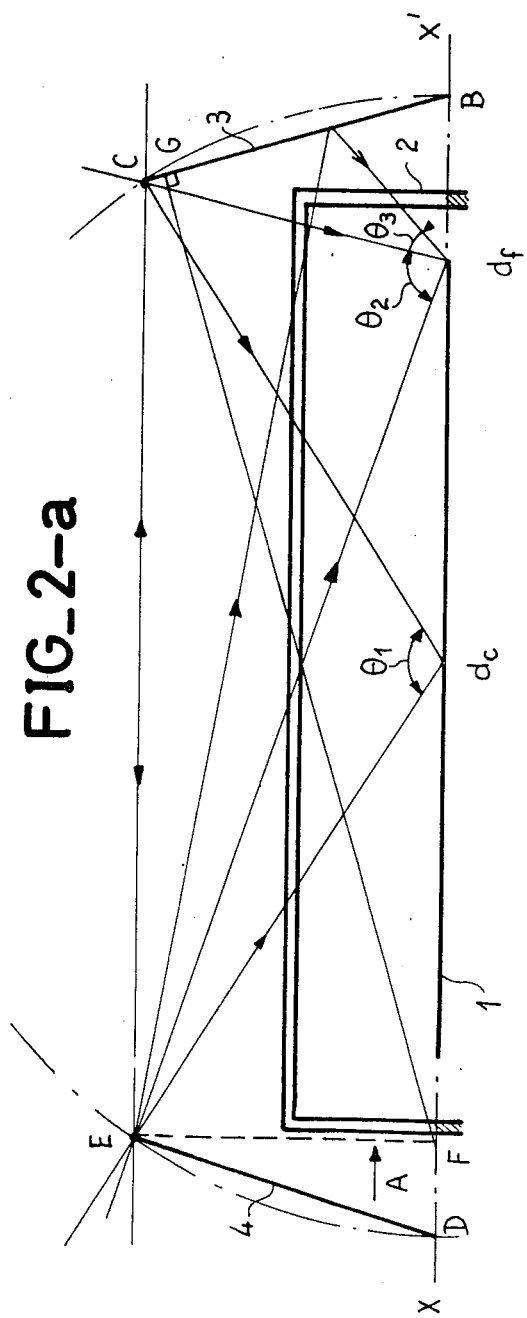
FIG_2-a
FIG_2-b
VIEW ACCORDING TO A

STRIP OF INFRA-RED DETECTORS COMPRISING A COLD SCREEN WITH A CONSTANT VIEWING ANGLE

FIELD OF THE INVENTION

The present invention relates to an infra-red detectors strip comprising a cold screen with a constant viewing angle.

DESCRIPTION OF THE PRIOR ART

According to a known system in the prior art, the infra-red detector strips are provided with a cold screen which restricts the viewing angle of the detectors and, hence, their inherent noise, thus increasing their sensitivity. As is known, see for example U.S. Pat. No. 4,420,688, infra-red detectors designed for low noise and high sensitivity typically are enclosed in a cryostat and the infra-red detection element is located on a support or cold table past which flows cooling fluid to maintain such detection element cooled. Generally, such cold table also supports a cooled screen that serves to limit the viewing angle of the radiation that is incident on the detector. Moreover, there will be regions in the cryostat less cooled, herein termed uncooled, that will be relatively warmer because they are more remote from the cooling influence of the cooling fluid.

FIG. 1a is a schematic diagram of an embodiment of an infra-red detector strip equipped with a cold screen 2 according to the prior art. The strip and the screen are placed on a cold table in a cryostat which is not shown in the figure. The FIGS. 1b and 1c represent the device of FIG. 1a seen from the side and the top respectivly.

Perpendicular to the axis XX' of the strip, the viewing angle of the detectors is constant and equal to 30° in the chosen example, as indicated in FIG. 1b.

By contrast, it is clear from observing the FIG. 1a that, along the axis of the strip, the viewing angle of the detectors varies according to the position of the detectors on the strip. The viewing angle $\theta_1$ for the central detector $d_c$ is far greater than the viewing angle $\theta_2$ for the detectors $d_f$ at the ends of the strip.

In the example shown in FIGS. 1a, b and c where the strip of detectors is 80 mm long and where the upper surface of the cold screen is 20 mm from the strip, the solid angle seen through the central detector is 0.95 steradian while the detectors at the end of the strip have a viewing angle of 0.62 steradian.

The problem that arises in the devices of the prior art and which the present invention seeks to solve is that of the great difference between the values of the viewing angles of the detectors in one and the same strip.

This problem is all the greater as the strips are large in size, as is the case for space applications for example.

Thus, in the example of FIGS. 1a, b or c, where the viewing angle along the axis of the strip varies from 0.95 to 0.62 steradian, this difference is reflected in a ratio of 1.55 between the photon fluxes.

This causes substantial variations in sensitivity for the detectors as well as difficulties in reading the strips by a multiplexer unit. During such a reading, one and the same load transfer device is used for all the detectors. It is difficult to dimension this load transfer device satisfactorily, and this fact results in poor quality reading.

SUMMARY OF THE INVENTION

The present invention proposes a strip of infra-red detectors comprising a cold screen with a constant viewing angle. The device used is simple, efficient and occupies a limited amount of space.

The present invention pertains to a strip of infra-red detectors comprising a cold screen of the type that provides, in a direction that is perpendicular to the axis of the strip, a constant viewing angle for all the detectors, the strip and the screen being placed for cooling on a cold table in a cryostat, wherein two mirrors are set at the ends of the strip and placed in a part of the cryostat not directly cooled by the coolant, to be described as "uncooled". These mirrors are arranged so that the detector placed in the centre of the strip detects, through reflection in the two mirrors, only cooled surfaces while the other detectors detect uncooled surfaces, through reflection in the two mirrors, in a proportion that increases with distance from the central detector of the strip, so that all the detectors of the strip have a substantially constant viewing angle along the axis of the strip.

BRIEF DESCRIPTION OF THE DRAWINGS

Other objects, characteristics and results of the invention will appear from the following description which is given by way of a non-exhaustive example and is illustrated by the appended figures of which:

FIGS. 1a, b and c depict different views of a mode an embodiment of a strip of infra-red detectors equipped with a cold screen according to the prior art;

FIGS. 2a and b depict views of an embodiment of a strip of infra-red detectors comprising a cold screen with a constant viewing angle according to the invention.

In the various figures, the same reference designate the same elements but, for reasons of clarity, the dimensions and proportions of the various elements are not maintained.

DESCRIPTION OF THE PREFERRED EMBODIMENTS

FIG. 2a is a schematic depiction of an embodiment of a device according to the invention.

As in the prior art, this device comprises on a cold table a strip of detectors 1 and a cold screen 2 which provides a constant viewing angle for all the detectors in a direction that is perpendicular to the axis XX' of the strip.

FIG. 2b is a view of the device of FIG. 2a along the direction A indicated in FIG. 2a. This FIG. 2b indicates the constant viewing angle, 30° for example, provided by the cold screen to all the detectors of the strip in a direction perpendicular to the axis XX' of the strip.

According to the invention, two cylindrical mirrors 3 and 4, respectively in the directions BC and DE in the plane of the FIG. 2a, are set at the ends of the strip, placed in an uncooled part of the cryostat that also contains cooled strip of detectors and the cold screen.

In the embodiment of FIGS. 2a and b, two identical cylindrical mirrors are used, positioned symmetrically with respect to the strip.

The shape and dimensions of these mirrors as well as their position is chosen so that the detector placed in the centre of the strip detects, by reflection in both mirrors, only cooled surfaces while the other detectors detect, by reflection in these two mirrors, uncooled surfaces in a proportion that increases with the distance from the central detector of the strip. Thus, along the axis XX' of the strip, each detector has an viewing angle which is substantially constant and equal to that of the central detector.

A thin line in FIG. 2a depicts the trajectory of some rays so as to highlight the fact that the central detector $d_c$ can detect, by reflection in the mirrors, only cooled surfaces, a factor that provides it with an viewing angle equal to $\theta_1$ along the axis XX'.

This viewing angle $\theta_1$ is obtained from two rays that end at the central detector $d_c$ and are supported on the upper ends of the mirrors 3 and 4. The central detector $d_c$ thus receives photons directly without there being any reflection in the mirrors.

We have also shown in FIG. 2a that the detector $d_f$ placed at the right end of he strip has an viewing angle equal to $\theta_2+\theta_3$. This viewing angle $\theta_2$ is obtained from two rays that end at this detector and are supported on the upper ends of the mirrors 3 and 4. The viewing angle $\theta_3$ is an additional viewing angle for the detector $d_f$ and is due to the reflection in the mirror 3 of a ray supported on the upper edge of the mirror 4. According to the invention, the viewing angle $\theta_1$ is substantially equal to the sum of the viewing angles $\theta_2$ and $\theta_3$.

For the detectors placed between the central detector and one of the end detectors, the additional viewing angle due to the reflection in one of th mirrors is less than $\theta_3$ because their initial viewing angle is greater than $\theta_2$.

For the central detector, the mirrors play the same role as the cold screen in the devices of the prior art in the sense that they are used only to restrict the angle of opening along the axis XX' without their reflective properties being used as is the case for the other detectors.

For the other detectors, the mirrors are used to receive an additional photon flux.

The embodiment depicted in FIGS. 2a and b uses identical cylindrical mirrors 3 and 4. The generators of the cylinders are parallel for the mirror 3 at BC and for the mirror 4 at DE. The guideline is a circle located in a plane perpendicular to the generators, the radius of which equals FG, F being the projection of the end E of the mirror 4 in the plane of the detectors and G being the projection of F in the mirror 3.

Various alternative embodiments of the invention may be contemplated.

For example, with respect to the shape of the mirrors used, it is possible to use cylindrical mirrors with another guideline radius or with an elliptical or parabolic guideline. It is also possible to use spherical, ellipsoidal, plane dihedral and other mirrors.

It is also possible to have an embodiment that does not use two identical mirrors, and wherein the mirrors will not be positioned symmetrically with respect to the strip.

In all these alternative embodiments, the shape and dimension of the mirrors as well as their position is always chosen so that the detector placed in the centre of the strip detects, through reflection in the two mirrors, only the cooled surfaces, while the other detectors detect uncooled surfaces through reflection in the two mirrors, in a proportion that increases with distance from the central detector of the strip, so that along the axis XX' of the strip each detector has a substantially constant viewing angle.

I claim:

1. An infra-red detecting device comprising a cooled strip of infra-red detectors and a cold screen for limiting a viewing angle of the strip in a plane perpendicular to the strip, said cold screen comprising two walls extending along the whole length of the strip, one on each opposed side of the strip, said walls having a height and being at a distance from the strip so as to define a limited viewing angle of the strip, wherein there are provided, beyond the ends of the walls of the cold screen, one mirror at each extremity of the strip, said mirrors arranged so that
    a detector located in a center portion of the strip will detect direct incident infra-red light with a first viewing angle in a plane parallel to the length of the strip, and will detect indirect light reflected from the mirrors, said indirect light coming solely from a cooled part of the device, and
    a detector located in another portion of the strip will detect direct incident infra-red light with a second viewing angle in said plane parallel to the axis of the strip, said second angle being smaller than said first angle, and will detect indirect light reflected from the mirrors, said indirect light including a first portion of light coming from a cooled part of the device and a second portion of light which does not come from a cooled portion of the device, said second portion being seen through a third viewing angle in said plane, the sum of said second and third viewing angles being substantially constant for all detectors of the strip and being substantially equal to said first angle.

2. An infra-red detecting device according to claim 1, wherein the two mirrors are identical and are positioned symmetrically with respect to the strip.

3. An infra-red detecting device according to claim 1, wherein the two mirrors are different.

4. In an infra-red detector that comprises a cryostat that encloses a cold table on which are supported a detector strip and a cold screen for limiting the viewing angle of the strip in a plane perpendicular to the strip, said cold screen comprising two side walls extending along the whole length of the strip on opposite sides of the strip, said walls defining a limited viewing angle of the strip, the improvement comprising
    means including a pair of mirrors, one at each of the two ends of the strip for providing that
    a detector located in a center portion of the strip will detect direct incident infra-red light with a first viewing angle in a plane parallel to the length of the strip, and will detect indirect light reflected from the mirrors, said indirect light coming solely from the cold screen, and
    a detector located in another portion of the strip will detect direct incident infra-red light with a second viewing angle in said plane parallel to the axis of the strip, said second angle being smaller than the first angle, and will detect indirect infra-red light reflected from the mirrors, said indirect light including a first portion coming from the cold screen, said second portion being seen through a third viewing angle in said plane, the sum of the second and third angles being substantially constant for all the detectors of the strip and being substantially equal to the first angle.

5. The infra-red detector of claim 4, in which the two mirrors are symmetrical and cylindrical

* * * * *